US 12,175,130 B2

United States Patent
Gao et al.

(10) Patent No.: US 12,175,130 B2
(45) Date of Patent: Dec. 24, 2024

(54) COMPUTATIONAL STORAGE AND NETWORKED BASED SYSTEM

(71) Applicant: Micron Technology, Inc., Boise, ID (US)

(72) Inventors: Shanyuan Gao, Bellevue, WA (US); Sen Ma, Bellevue, WA (US); Moon Mark Hur, Kirkland, WA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/152,063

(22) Filed: Jan. 9, 2023

(65) Prior Publication Data

US 2023/0161512 A1 May 25, 2023

Related U.S. Application Data

(63) Continuation of application No. 16/832,737, filed on Mar. 27, 2020, now Pat. No. 11,550,500.
(Continued)

(51) Int. Cl.
*G06F 3/06* (2006.01)
(52) U.S. Cl.
CPC ............ *G06F 3/0659* (2013.01); *G06F 3/061* (2013.01); *G06F 3/0658* (2013.01); *G06F 3/067* (2013.01); *G06F 3/0683* (2013.01)
(58) Field of Classification Search
CPC ...... G06F 3/061; G06F 3/0658; G06F 3/0659; G06F 3/067; G06F 3/0679; G06F 3/0683
See application file for complete search history.

(56) References Cited

U.S. PATENT DOCUMENTS

| 8,799,903 B1 | 8/2014 | Talwar et al. |
| 11,550,500 B2 | 1/2023 | Gao et al. |

(Continued)

FOREIGN PATENT DOCUMENTS

| CN | 104885062 A | 9/2015 |
| CN | 106575271 A | 4/2017 |

(Continued)

OTHER PUBLICATIONS

Extended European Search Report for EP Application No. 20783318.7; mailed Oct. 14, 2022; pp. all.
International Application No. PCT/US20/25405, titled "Computational Storage and Networked Based System", dated Mar. 27, 2020, pp. all.
(Continued)

*Primary Examiner* — Yong J Choe
(74) *Attorney, Agent, or Firm* — Dorsey & Whitney LLP

(57) ABSTRACT

Methods, systems, and apparatuses related to computational storage are described. For example, storage accessible to an accelerator may be shared between and, accessible to either of, a host and the accelerator. A computational storage system may include storage providing a portion of a shared file system accessible by a host and by accelerator logic of the computational storage system. Host interface logic may be configured to receive a storage command from the host to store data on the storage at a time the data is created. The host interface logic may be further configured to receive a storage command from the host for the accelerator logic to perform a computational task using the stored data on the storage. The accelerator logic can perform the computational task using the stored data on the storage.

17 Claims, 6 Drawing Sheets

Related U.S. Application Data

(60) Provisional application No. 62/826,591, filed on Mar. 29, 2019.

(56) References Cited

U.S. PATENT DOCUMENTS

| | | | |
|---|---|---|---|
| 2010/0169271 | A1 | 7/2010 | Yasui et al. |
| 2014/0040395 | A1 | 2/2014 | Rajagopal et al. |
| 2015/0106410 | A1 | 4/2015 | Zaltsman et al. |
| 2015/0155876 | A1 | 6/2015 | Jayasena et al. |
| 2019/0073139 | A1 | 3/2019 | Kim et al. |
| 2019/0332549 | A1 | 10/2019 | Blaner et al. |
| 2019/0342393 | A1* | 11/2019 | Bhattacharya .......... H04L 67/61 |
| 2020/0117517 | A1* | 4/2020 | Costa ..................... G06F 9/546 |
| 2020/0310694 | A1 | 10/2020 | Gao et al. |

FOREIGN PATENT DOCUMENTS

| | | |
|---|---|---|
| KR | 20180019818 A | 2/2018 |
| KR | 101847262 B1 | 5/2018 |
| KR | 101858597 B1 | 5/2018 |

OTHER PUBLICATIONS

IPRP dated Oct. 14, 2021 for PCT Application No. PCT/US2020/025405, pp. all.

International Search Report and Written Opinoin dated Jul. 17, 2020 for International Application No. PCT/US2020/025405, 10 pgs.

Mark Silberstein and Idit Keidar "A Shared File System Abstraction for Heterogeneous Architectures"; Department of Electrical Engineering, Israel Institute of Technology, Haifa 32000, Israel, CCIT Report #782, Jan. 2011; pp. all.

U.S. Appl. No. 16/832,737, titled "Computational Storage and Networked Based System", dated Mar. 27, 2020, pp. all pages of the application as filed.

Do, et al., "Query processing on smart ssds: Opportunities and challenges," in Proceedings of the 2013 ACM SIGMOD International Conference on Management of Data, ser. SIGMOD '13. New York, NY, USA: ACM, 2013, pp. 1221-1230.

Keeton, et al. "A case for intelligent disks (idisks)," SIGMOD Rec., vol. 27, No. 3, pp. 42-52, Sep. 1998.

Silberstein, Mark et al., "A Shared File System Abstraction for Heterogeneous Architectures", Department of Electrical Engineering, Israel Institute of Technology, Jan. 2011; pp. all.

\* cited by examiner

COMPUTATIONAL STORAGE AND NETWORKED BASED SYSTEM

CROSS-REFERENCE TO RELATED APPLICATION(S)

This application is a continuation of U.S. patent application Ser. No. 16/832,737 filed Mar. 27, 2020 and issued as U.S. Pat. No. 11,550,500, which application claims the benefit under 35 U.S.C. § 119 of the earlier filing date of U.S. Provisional Application Ser. No. 62/826,591 filed Mar. 29, 2019. The aforementioned applications, and issued patent, are incorporated herein by reference, in their entirety, for any purpose.

TECHNICAL FIELD

Examples described herein relate generally to computational storage and systems.

BACKGROUND

Heterogeneous computing units, often called accelerators, typically have architectures and instruction sets different from general CPUs. Some accelerators may have floating point compute cores working in parallel and some accelerators may have customized compute logic to accelerate certain applications. To incorporate accelerators in an application, a programmer may profile the application and identify the compute intensive tasks, then partition the application into host code and accelerator code. During execution, the host application transfers input data to the accelerators, and the accelerators are programmed to perform operations on the input data and then write the results back to the host.

SUMMARY

Example apparatus are described herein. Some examples of apparatus include a host interface and logic configured to connect with a host via the host interface and to perform computational tasks communicated from the host. A storage controller coupled to the logic is configured to communicate with storage that comprises nonvolatile memory, where the storage forms part of a shared file system between the logic and the host, and where data residing on the storage is accessible by the logic for the computational task communicated from the host device.

In some examples, the data may be created responsive to a command from the host and the data may be stored on the storage at a time of creation of the data.

In some examples, the shared file system may be further shared by one or more additional hosts.

In some examples, the logic may include an application-specific integrated circuit (ASIC).

In some examples, the logic may include a field programmable gate array (FPGA), where the logic may be configured to receive instructions from the host to configure the logic to perform the computational task.

Some examples may further include a memory controller coupled to the host interface and the logic.

In some examples, the memory controller may be configured to receive additional data from the host and to communicate the additional data to the logic.

In some examples, the logic may be further configured to write a result of the computational task to the storage.

Some examples may further include second storage configured to provide a second portion of the shared file system accessible by the host and by the logic.

Examples of methods are described herein. Some example methods include receiving a computational task from a host at logic coupled to a storage controller, where the storage controller is configured to communicate with storage that comprises nonvolatile memory, accessing data residing on the storage, where the storage forms part of a shared file system between the host and the logic, and performing the computational task using the data as the data is accessed via the storage controller.

In some examples, a second storage may form a second portion of the shared file system and performing the computational task further comprises using second data residing on the second storage.

In some examples, the storage controller may be coupled to host interface logic to provide access to the storage by the host.

Some example methods may further include writing data generated as a result of the computational task to the storage.

In some examples, the computational task received from the host may include instructions to customize the logic for performance of the computational task.

Examples of systems are described herein. Some example systems may include storage comprising nonvolatile memory, where the storage is configured to provide a portion of a shared file system accessible by a host and by logic coupled to a storage controller configured to communicate with the storage, a host interface coupled to the logic, where the host interface is configured to receive a storage command from the host to store data on the storage at a time the data is created, where the host interface is further configured to receive a task from the host for the logic to perform a computational task using the stored data on the storage, where the logic is configured to perform the computational task using the stored data on the storage.

In some examples, the logic may be further configured to write a result of the computational task to the storage.

In some examples, the logic may be further configured to receive instruction from the host to configure the logic to perform the computational task.

Some example systems may further include second storage configured to provide a second portion of the shared file system accessible by the host and by the logic.

In some examples, the computational task may further use second data residing on the second storage and the logic may be further configured to perform the computational task using the stored data on the storage and the second data on the second storage.

DETAILED DESCRIPTION

As data analysis becomes more complex, including machine learning, artificial intelligence, and generally large data sets, computational speed may be improved through use of accelerators. An accelerator generally refers to hardware (e.g., circuitry) provided to perform designated computational tasks. For example, an accelerator may include one or more field programmable gate arrays (FPGAs) and/or application specific circuits (ASICs) that may be designed to perform particular computations. Computationally intensive tasks may be offloaded from a host CPU and performed by an accelerator so that the host CPU is free to continue executing other tasks. However, offloading a computational task to an accelerator often includes sending data used in the computational task (e.g., data analyzed by the task) from the host CPU to temporary memory (e.g., a DRAM buffer) accessible by the accelerator. The time and energy used in retrieving data from the host CPU and sending the data to accelerator memory can have a significant impact on time and energy savings realized through use of an accelerator instead of utilizing the host CPU for complex computational tasks.

Examples of computational storage systems described herein generally provide storage accessible to an accelerator which forms part of a shared filed system shared between the host and the accelerator. Because the host and the accelerator can both access data on the storage, the host may store data on the storage when the data first comes into the system (for example, through collection or download from an outside source, or through being generated by the host). To perform a task utilizing the data on the storage, the host may send one or more commands (e.g., a series of API calls) to the accelerator access the data on the storage and perform the computational task identified by the host. Because the data is part of a shared file system, the host may send a pointer to the data instead of sending the data itself over an interface between the host and the accelerator, saving time and resources. The interface between the logic in the accelerator used to perform a task and the storage may be different, and in some examples faster, than the interface between the host and the accelerator. In this manner, accessing data using the interface between the accelerator logic and the storage may be preferable to receiving data over a host interface for use by the accelerator logic.

Figure 1:
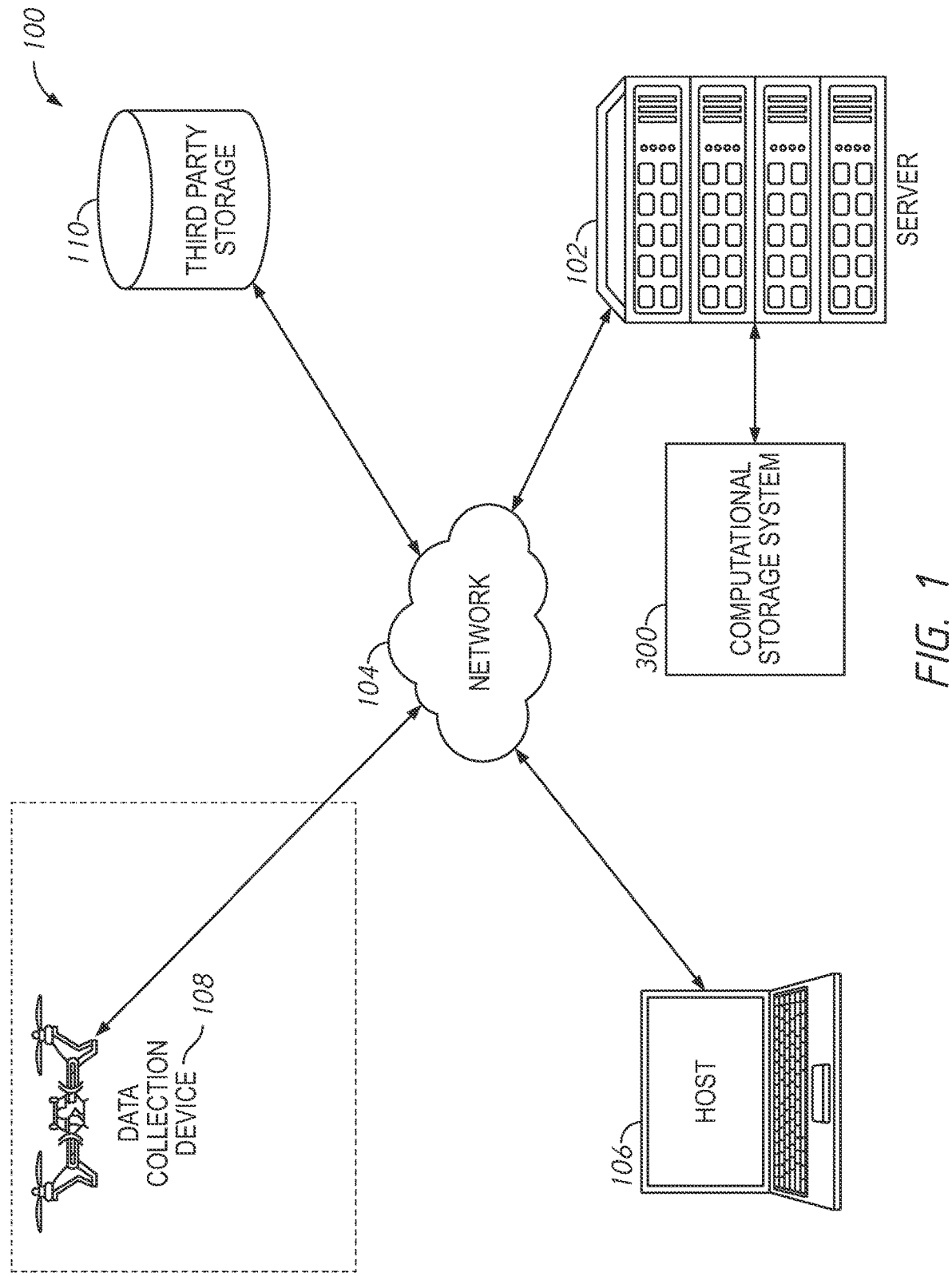
FIG. 1 is a schematic illustration of an environment 100 in accordance with examples described herein.

FIG. 1 illustrates an example use of a computational storage system 100. As shown in FIG. 1, the host 106 and a server 102 are connected via a network 104. The server 102 includes a computational storage system 300. For example, the computational storage system 300 may be a discrete piece of hardware located in a rack of the server 102, such that accelerator logic of the computational storage system 300 and storage of the computational storage system 300 may be physically connected. In other implementations, the components of the computational storage system 300 may be located in separate portions of the server 102 or at additional servers accessible through the network 104. The components shown in FIG. 1 are exemplary only. Additional, fewer, and/or different components may be used in other examples.

In various embodiments, the network 104 may be implemented using the Internet, a local area network (LAN), a wide area network (WAN), and/or other network(s). In addition to traditional data-networking protocols, in some embodiments, data may be communicated according to protocols and/or standards including near field communication (NFC), Bluetooth, cellular networks, and the like. Further, the network 104 may include different connections between various devices and components shown in FIG. 1. For example, the host 106 may connect to the server 102 and computational storage system 300 through a WAN connection, to the third party storage 110 through the Internet, and to the data collection device 108 through a cellular network. The host 106, server 102, and other components may connect to the network 104 via a physical connection, such as a peripheral component interconnect express (PCIe) interface.

Examples described herein may include a host and/or may be utilized with a host, such as host 106. The host 106 may be implemented using any number of computing devices including, but not limited to, a computer, a laptop, tablet, mobile phone, smart phone, smart speaker, vehicle (e.g., automobile), or appliance. Generally, the host 106 may include one or more processors, such as a central processing unit (CPU) and/or graphics processing unit (GPU). The host 106 may generally perform operations by executing executable instructions (e.g., software) using the processor(s). As described herein, in some examples, the host 106 may communicate with one or more servers and/or computational storage systems to obtain acceleration of certain computational tasks.

Examples described herein may include data collection devices, such as data collection device 108 of FIG. 1. While a single data collection device 108 is depicted, any number may be included in systems described herein. Any number of devices may be used to implement data collection device 108—including a drone, smart phone, smart speaker, computer, sensor, video camera, camera, microphone, etc.

Examples described herein may include storage devices, such as third party storage 110 of FIG. 1. For example, third party storage 110 may be a database, server, or other repository of data accessible via the Internet or other network 104. Third party storage 110 may include more than one physical device and may, in some implementations, include storage components and devices belonging to more than one different third party.

Examples herein may include or be utilized with a server, such as server 102 of FIG. 1, including a computational storage system, such as computational storage system 300 of FIG. 1. The computational storage system 300 broadly includes accelerator logic configured to perform computational tasks and storage. The storage of the computational storage system 300 may be nonvolatile memory and the storage system may include other volatile or nonvolatile memory configured to store computer readable data and instructions to implement various embodiments of the processes described herein. Accelerator logic may include configurable logic (e.g., one or more FPGAs) or may be computer-executable instructions stored on volatile or nonvolatile memory within the computational storage system 300.

Using the system shown in FIG. 1, the host 106 may initiate collection of data by the data collection device 108 and direct analysis of the collected data using the computational storage system 300. The host 106 may also access data for analysis from third party storage 110 and direct analysis of that data using the computational storage system 300.

In one example shown in FIG. 1, the host 106 directs the gathering of data by the data collection device 108 and the analysis of the gathered data using the computational storage system 300. The data collection device 108 is shown as an unmanned aerial vehicle (UAV) collecting image data, though other data collection devices may be directed by the host 106 including, for example, satellites, other manned or unmanned aircraft, weather stations, medical sensors, medical imaging devices, genomic sequencers, radio telescopes, or the like. In the example described herein, the data collection device 108 captures aerial image data over a large land area for use in a maximum likelihood classification (MLC) by the host 106 to determine land cover features for the land area included in the image data captured by the data collection device 108.

The host 106 may direct the data collection device 108 in collecting the data by providing inputs such as, for example, coordinates of land coverage, altitude, image resolution, etc. In other implementations, the data collection device 108 may initiate data collection and communicate collected data to the host 106. Once the data is collected by the data collection device 108, the host 106 may direct the data collection device 108 to store the data on the computational storage system 300 at the server 102. Because storage of the computational storage system 300 is directly addressable by the host 106, the host 106 can provide the data collection device 108 with a specific location within a shared file system to store the data. The shared file system may be, for example a file system including data on memory of the host, data located on the storage of the computational storage system 300, and, in some implementations, data stored in other physical locations. Data stored within the shared file system is addressable by both the host and the accelerator logic of the computational storage system 300.

To run a computational task (e.g., MLC) using the data collected by the data collection device 108, the host 106 may send a series of commands (e.g., API calls) to accelerator logic of the computational storage system 300 to perform the MLC for the image data. For example, the host 106 may initialize the accelerator logic, pass parameters to the accelerator logic, and launch the task at the accelerator logic. The parameters passed to the accelerator logic by the host 106 generally include a pointer to the data on the computational storage system 300 and the data size. In some implementations, where the accelerator logic is reconfigurable, such as a field programmable gate array (FPGA), the host 106 may send configuration information to the accelerator logic. In other implementations, where the accelerator logic is an application-specific integrated circuit (ASIC), the host 106 may send compiled instructions for the task to the accelerator logic. When the host 106 sends an API call to the computational storage system 300 to launch the task at the accelerator logic, the accelerator logic performs the MLC for the image data by accessing the data from the storage on the computational storage system 300.

Once the accelerator logic has executed the task requested by the host 106, the result of the task may be stored on the computational storage system 300, returned to the host 106, displayed at a display of the host 106, sent to a different storage location, or any combination of the previous options, as instructed by the host 106.

The computational storage system 300 may be used similarly to run analysis on data stored initially on third party storage 110. For example, the host 106 may have access to a shared data repository of image data collected by various research entities or other parties, stored on third party storage 110 and accessible via the Internet or other network 104. To download data on third party storage 110, the host 106 may initiate a download request including a download location within the shared file system of the computational storage system 300. Analysis of the downloaded data may occur in the same way as described above for data collected by the data collection device 108.

In some implementations, more than one host 106 may be connected to the server 102 and share a computational storage system 300. Further, the server 102 may include more than one computational storage system 300 and the storage components of the multiple computational storage systems may together form a shared file system accessible by multiple hosts performing analysis on shared data. For example, an acceleration system may include one or more computational storage systems and other heterogeneous computing systems for use by hosts in communication with the server 102.

Figure 6:
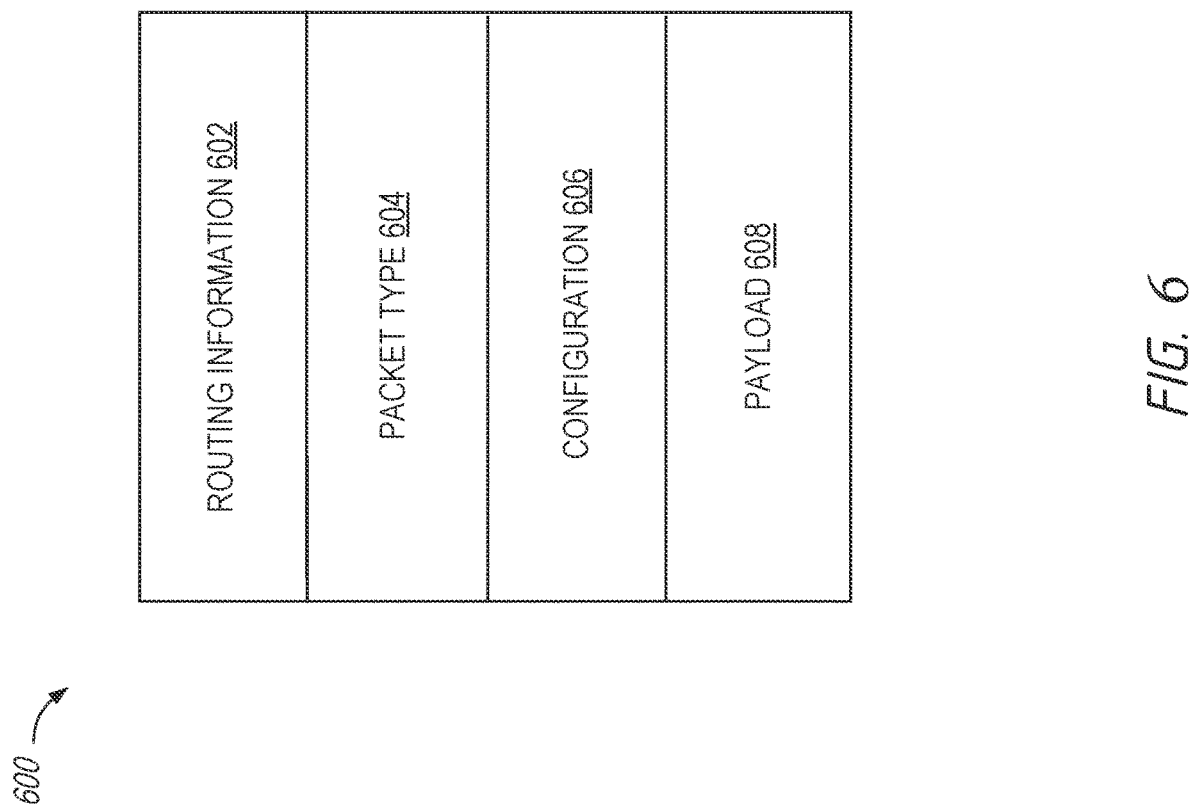
FIG. 6 illustrates a data packet 600 in accordance with examples described herein.

The host 106, the data collection device 108, third party storage 110, and other computing devices may communicate with the computational storage system 300 using data packets, such as a packet 600 shown in FIG. 6. The packet 600 includes routing information 602, packet type 604, configuration information 606, and payload 608. Depending upon the type of packet, packets may include additional or different information. The packet 600 is generally an example packet for communication between the host 106 or the data collection device 108 and the computational storage system 300.

Routing information 602 identifies the computational storage device and may further include a source identifier or network flow control. In an exemplary implementation, the routing information 602 is an IP address including a designated port. The packet type 602 identifies the type or purpose of the packet 600. For example, the packet 600 may a pure data packet, a control or command packet, or a configuration packet. Generally, control and command packets do not include configuration 606 or payload 608.

Configuration packets include configuration 606, which may be, for example, information that configures logic of the computational storage system 300 to perform a task. Where logic of the computational storage system 300 includes an FPGA, the configuration 606 may be a bitstream. Where logic of the computational storage system 300 includes an ASIC, the configuration 606 may be compiled instructions. Pure data packets generally include payload 608. The payload 608 is generally the data conveyed by the packet 600. Some packets 600 may be a combination of configuration packets and storage packets including both configuration 606 and payload 608. In some implementations, configuration 606 and payload 608 may be pointers pointing the computational storage system 300 to an external location (e.g., third party storage 110) so that the computational storage system 300 may retrieve its configuration or payload data from the external location.

Figure 2:
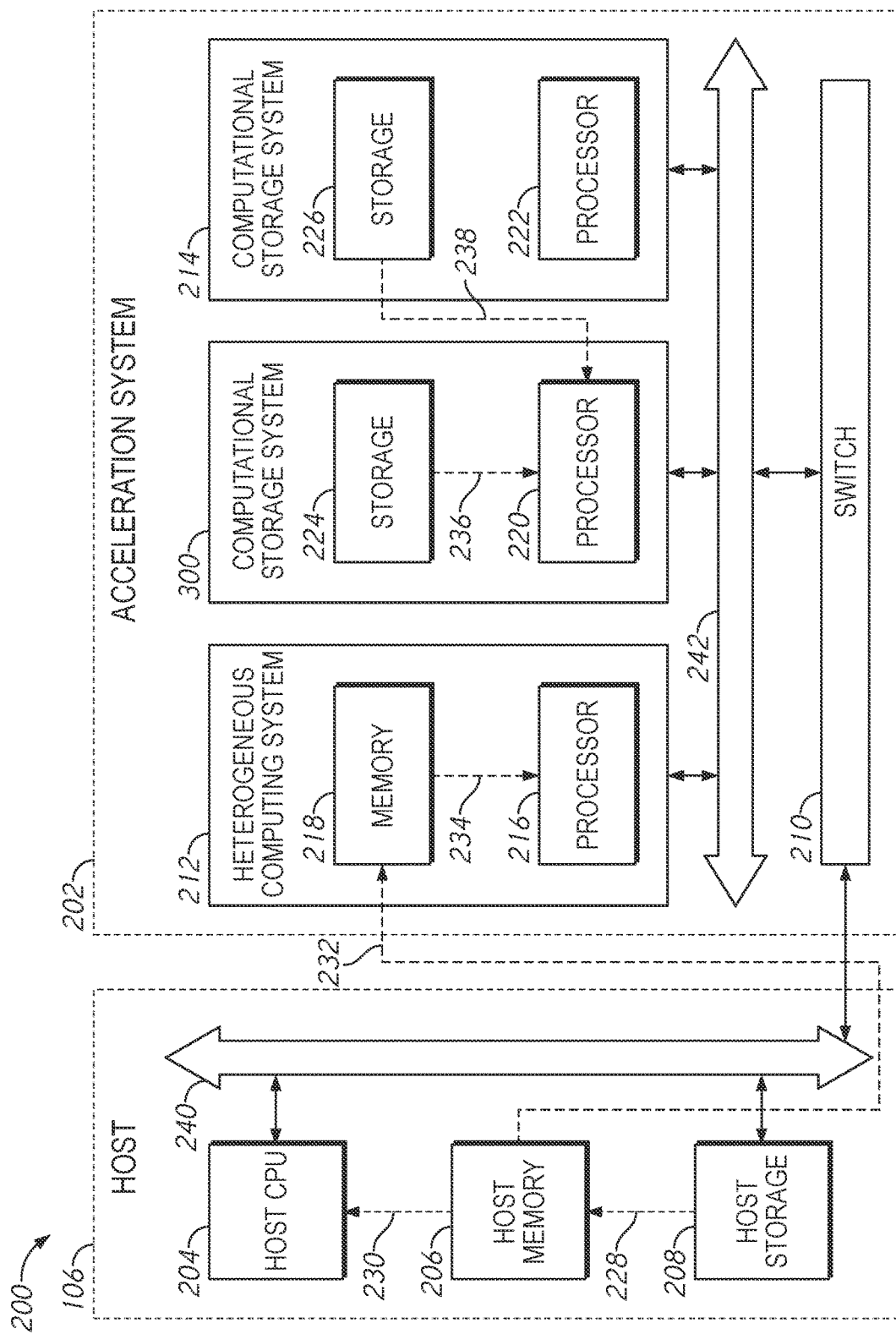
FIG. 2 is a schematic illustration of an acceleration architecture 200 in accordance with examples described herein.

FIG. 2 is a schematic illustration of acceleration architecture 200 arranged in accordance with examples described herein. FIG. 2 includes a host 106 in communication with an acceleration system 202. The host 106 includes a host CPU 204, host memory 206, and host storage 208, coupled to a peripheral interface 240. The peripheral interface is coupled to a switch 210 of the acceleration system 210. The acceleration system 210 includes a heterogeneous computing system 212, a computational storage system 300, and a computational storage system 214 coupled to a peripheral interface 242. The heterogeneous computing system 212 includes memory 218 coupled to processor 216. The computational storage system 300 includes storage 224 coupled to processor 220. The computational storage system 214 includes storage 226 coupled to processor 222. The elements shown in FIG. 2 are exemplary only. Additional, different, and/or fewer components may be used in other examples.

Although the host 106 of FIG. 2 is illustrated using the same reference number as host 106 of FIG. 1, it is to be understood in some examples that the host 106 of FIG. 1 may be implemented with variations other than those shown specifically in FIG. 2. Similarly, although the computational storage system 300 of FIG. 2 is illustrated using the same reference number as computational storage system 300 of FIG. 1, it is to be understood in some examples that the computational storage system 300 of FIG. 1 may be implemented with variations other than those shown specifically in FIG. 2.

Examples herein may include a host and/or be utilized with a host, such as host 106. The host 106 may be implemented using any number of computing devices including, but not limited to, a computer, a laptop, tablet, mobile phone, smart phone, smart speaker, vehicle (e.g., automobile), or appliance. Generally, the host 106 may include one or more processors, such as the CPU 204 and/or graphics processing unit (GPU). The host 106 may generally perform operations by executing executable instructions (e.g., software) using the processor(s). As described herein, in some examples, the host 106 may communicate with one or more servers and/or computational storage systems to obtain acceleration of certain computational tasks.

Examples herein may include an acceleration system and/or be utilized with an acceleration system, such as acceleration system 202. The acceleration system 202 may be a single piece of hardware such that the heterogeneous computing system 212, computational storage system 300, and computational storage system 214 are physically coupled, or the heterogeneous computing system 212, computational storage system 214, and computational storage system 300 may be communicatively connected (e.g., as separate elements on a server or on separate servers linked by a network).

Examples of the acceleration system 202 herein may include a heterogeneous computing system 212, a computational storage system 300, and a computational storage system 214. In some implementations the heterogeneous computing system 212, the computational storage system 214, and the computational storage system 300 may have similar or the same hardware components and may act as either a computational storage system or a heterogeneous computing system depending on commands received from the host 106. The computational storage systems 300 and 212, for example may include memory similar to memory 218.

The example computational storage systems 300 and 212 and the example heterogeneous computing system described herein may include or utilize processors (e.g., processors 216, 220, and 222 of FIG. 2. The processors 216, 220, and 222 may be implemented as processing logic for executing computational tasks. For example, the processors 216, 220, and 222 may be implemented by configurable logic, such as one or more FPGAs or may be implemented as computer readable instructions stored on volatile or nonvolatile memory.

The example computational storage systems 300 and 212 may include or utilize storage, such as storage 224 and storage 226. The storage 224 and 226 may be nonvolatile storage components including, but not limited to, SSDs, NVMe SSDs, persistent memory, mechanical drives, and other types of nonvolatile memory or nonvolatile storage.

The host 106 connects to a peripheral interface 240 and sends data and commands to the acceleration system 202 using the peripheral interface 240. The peripheral interface 240 is communicatively connected (e.g., physical or wireless connection) to a switch 210 of the acceleration system 202 that switches data received from the peripheral interface 240 to a peripheral interface 242 of the acceleration system 202. The heterogeneous computing system 212, computational storage system 214, and computational storage system 300 connect to the peripheral interface 242 to receive commands and data from the host 106. In some implementations, the peripheral interface 240 and peripheral interface 242 are PCIe interfaces, though other types of interfaces are contemplated.

The acceleration architecture 200 shown in FIG. 2 may support analysis of data in several ways. The host CPU 204 may execute computational tasks for data stored on host storage 208. A processor 216 of the heterogeneous computing system 212 may also be used to execute computational tasks for data stored on host storage 208 by sending data to the heterogeneous computing system 212. A processor 220 of the computational storage system 300 may be used by the host storage 208 to execute tasks for data stored on either the storage 224 of the computational storage system 300 or storage 226 of the computational storage system 214.

To analyze data stored on the host storage 208, the data moves along a path 228 from the host storage 208 to the host memory 206 and a path 230 from the host memory 206 to the host CPU 204. Resultant data may move along path 230 from the host CPU 204 to the host memory 206 and along path 228 from the host memory 206 to host storage 208. Using the host CPU 204 to analyze data of the host storage 208 removes data movement between the host 106 and the acceleration system 202. For computationally intense tasks, however, the analysis may fully utilize the host CPU 204 or may take a long time due to the host CPU 204 executing other tasks in parallel.

The processor 216 of the heterogeneous computing system 212 may also be used to analyze data stored on host storage 208. The data moves from the host storage 208 to the host memory 206 along path 228 and then from the host memory 206 to the memory 218 of the heterogeneous computing system 212 along path 232 (generally through the peripheral interface 240, the switch 210, and the peripheral interface 242). Finally, the data moves from the memory 218 of the heterogeneous computing system 212 to the processor 216 for processing. For some data-intensive tasks, this cycle of data movement may occur more than once to execute a single command. For example, the data used as input for a computational task may use more storage space than is available on the memory 218 of the heterogeneous computing system 212. Movement of data between the host 106 and the heterogeneous computing system 212, especially repeated movement, may slow total computation time for tasks with large amounts of input data.

As described with respect to FIG. 1, the host 106 may utilize the storage 224 of the computational storage system 300 and the storage 226 of the computational storage system 214 as part of a shared file system when creating or collecting data for later analysis. In an example where data is stored on storage 224 of the computational storage system 300, the host 106 may send a series of API calls or other commands to instruct the processor 220 of the computational storage system 300 to execute commands to analyze the data. The data is moved along a path 236 from the storage 224 to the processor 220 for the processor 220 to execute the commands. The data does not move between the acceleration system 202 and the host 106, saving time and data transfer resources.

In an example where data is stored on storage 226 of the computational storage system 214, the host 106 may instruct the processor 220 of the computational storage system 300 to execute tasks to analyze the data. Because the computational storage system 214 and the computational storage system 300 are both connected to the peripheral interface 242, the data from the storage 226 may transfer from the storage 226 to the processor 220 along the path 238, bypassing the host 106 and minimizing data transfer. This may be especially helpful where the processor 220 is instructed to perform a computational task using more than one subset of data, where some data is stored on storage 224 and some data is stored on storage 226.

For all implementations, resultant data may be transmitted to storage using the same paths or different paths as the input data. For example, the processor 216 of the heterogeneous computing system 212 may execute a computational task using input data from the host storage 208. If a user wishes to later use the heterogeneous computing system 212 as a computational storage system to run additional analysis of the resultant data, the resultant data may be stored on storage of the heterogeneous computing system 212 (not shown in FIG. 2). Alternatively, resultant data could be stored on storage 224 of computational storage system 300, storage 226 of computational storage system 214, or returned to the host 106 along path 232 for storage at the host storage 208. Similarly, resultant data from the processor 220, processor 222, or host CPU 204 could be transmitted for storage on any storage component within the acceleration system 202.

Figure 3:
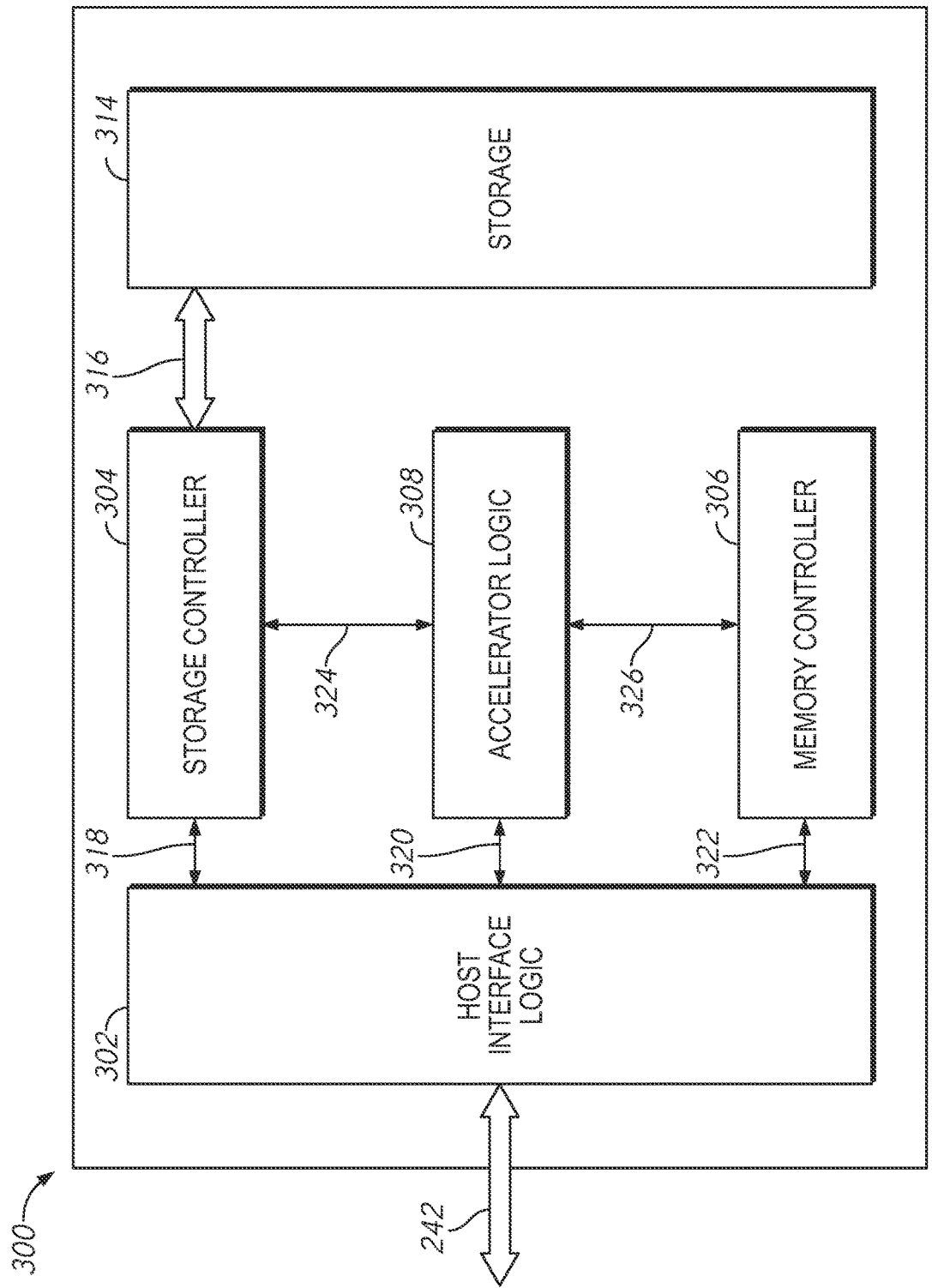
FIG. 3 is a schematic illustration of a computational storage system 300 in accordance with examples described herein.

FIG. 3 illustrates a computational storage system 300. As described above with respect to FIG. 1 and FIG. 2, the computational storage system 300 may be implemented in a server (e.g., server 102) individually, as distributed components, or as part of an acceleration system (e.g., acceleration system 202). Though the computational storage system 300 is shown including storage 314, in some implementations, the computational storage system 300 may include multiple storage components forming a shared file system between one or more hosts (e.g., host 106) and accelerator logic 308 of the computational storage system 300. The computational storage system 300 may be implemented as a single piece of hardware (e.g., with all components on a single board) or may be implemented with the storage 314 connected to other components of the computational storage system 300 through a storage peripheral interface 316, either physically or wirelessly connected to the computational storage system 300.

Although the computational storage system 300 of FIG. 3 is illustrated using the same reference number as computational storage system 300 of FIGS. 1 and 2, it is to be understood in some examples that the computational storage system 300 of FIGS. 1 and 2 may be implemented with variations other than those shown specifically in FIG. 3.

Examples herein may include and/or be utilized with host interface logic, such as host interface logic 302 of FIG. 3. Host interface logic 302 may be implemented in various ways to provide direct memory access (DMA) capability to the host 106. For example, the host interface logic 106 may be implemented as a stream-based scatter-gather DMA engine. The host interface logic 106 may also be implemented as a network interface, giving the computational storage system 300 the ability to connect directly to a network. The host interface logic 106 may also be embedded within the accelerator logic 309 as general logic of the computational storage system 300.

Examples herein may include and/or be utilized with accelerator logic, such as accelerator logic 308 of FIG. 3. The accelerator logic 308 may be implemented as reconfigurable logic, such as a FPGA, that can be reconfigured by a command from a host (e.g., the host 106) prior to execution of a computational task. The reconfiguration allows the accelerator logic 308 to be used for a variety of computational tasks through reconfiguration prior to task execution. In other implementations, the accelerator logic 308 may be static logic configured for repeated execution of a specific computational task.

Examples herein may include and/or be utilized with a memory controller, such as memory controller 306 of FIG. 3. A memory controller 306 may be a double data rate (DDR) memory controller providing access to DDR memory for the accelerator logic 308 and hosts via the host interface logic 302.

Examples herein may include and/or be utilized with storage, such as storage 314 of FIG. 3, managed by a storage controller, such as storage controller 304 of FIG. 3. The storage controller 304 receives and directs read and write operations to the storage 314. In one implementation, the storage controller 304 is an Non-volatile memory express (NVMe) controller, the storage peripheral interface 316 is a PCIe interface, and the storage 314 is an NVMe SSD. In other implementations, the storage 314 may be another type of nonvolatile memory. In some implementations, the computational storage system 300 may include additional storage controllers and storage components accessible by both the accelerator logic 308 and the host 106.

Commands (e.g., commands from the host 106) come into the computational storage system 300 through the peripheral interface 242. Commands from the host 106 (and any other host using the computational storage system 300) are generally formatted to access one or more of a storage controller 304, accelerator logic 308, or a memory controller 306. For example, commands may be formatted from the host 106 as streams including dedicated stream IDs and memory mapping of a particular resource in addition to regular stream parameters. For example, a stream from the host 106 to store data on the storage 314 would include a header within the stream identifying the storage controller 304. For example, an AXI memory-map protocol may be used to identify the storage controller 304.

Host interface logic 302 receives communications from the peripheral interface 242 and directs communications to one or more of the storage controller 304, accelerator logic 308, or memory controller 306 by parsing out the resource addresses embedded in streams received from the host 106. The host interface logic 302 provides DMA capability to the host 106, allowing the host 106 to access the storage controller 304 (and, accordingly the storage 314) by directing communications, such as commands or data to the storage controller 304 from the host interface logic 302. The host interface logic 302 may be implemented in various ways to provide DMA capability to the host 106. In one implementation, the host interface logic 302 is implemented as a stream-based scatter-gather DMA engine, allowing multiple streams to simultaneously access the storage controller 304, the accelerator logic 308, and the memory controller 306. Based on the received stream, the host interface logic 302 directs a stream received from a host to the memory controller 306 via a host memory path 322, to the accelerator logic 308 via a host accelerator path 320, or to the storage controller 304 via a host storage path 318.

The accelerator logic 308 may be coupled to the memory controller 306 by an accelerator memory path 326 and to the storage controller 304 by an accelerator storage path 324. Both the accelerator storage path 324 and accelerator memory path 326 may be memory-mapped interfaces (e.g., AXI memory-mapped interfaces) to allow the accelerator logic 308 to directly access the storage 314 and DDR memory accessible through the memory controller 306. Because the accelerator logic 308 includes connections to both the memory controller 306 and the storage controller 304, the accelerator logic 308 may be used to analyze data stored on the storage 314 (CSS mode) or data sent from a host and temporarily stored on DDR memory accessible by the memory controller 306.

In an example, the computational storage system 300 receives communications from a host (e.g., host 106 of FIG. 2) to store and analyze data using the computational storage system 300.

As described above, the host 106 may access the storage 314 as part of a shared file system with the accelerator logic 308. The shared file system may support basic file operations such as Open ( ), Close ( ), Write ( ), and Read ( ) through commands from the host 106 and the accelerator logic 308.

The host 106 may access the storage controller 304 to store data or to access data previously stored on the storage 314. The host 106 may also access the shared file system using the storage controller 304 to direct storage of data (e.g., data retrieved from an outside data source or collected using a data collection device) on the storage 314. The host 106 generally sends a stream to the host interface logic 302 identifying the storage controller 304. The stream generally includes additional information, such as data for transfer to the storage 314 or a pointer to a new file in the shared file system of the storage 314. When the stream is received, the host interface logic 302 locates the storage controller 304 identification in the stream and transmits the stream to the storage controller 304. In one example, a new file is created within the shared file system on the storage 314 so that the host 106 can direct storage of data collected by a data collection device to the newly created file.

A host may further use the accelerator logic 308 to analyze data stored on the storage 314 where the analysis is initiated by the host 106. The host may send a request to the host interface logic 302 formatted a stream with a pointer to the data on the storage 314. The request may include additional streams including reconfiguration information to reconfigure the accelerator logic 308 to perform the computational task requested by the host. Streams including reconfiguration information and identifying data to use as input for the computational task may include a identifier identifying the accelerator logic 308. The host interface logic 302 receives the communication 406, parses the identifier, and sends the streams to the accelerator logic. In some implementations, the host interface logic 302 may simultaneously send other streams from the host 106 to, for example, a memory controller 306.

Where the request includes reconfiguration information for the accelerator logic 308, the accelerator logic 308 is reconfigured to perform the computational task. The accelerator logic 308 may send some information for task execution, including reconfiguration information to the memory controller 306 for temporary storage and access by the accelerator logic 308. The accelerator logic 308 sends the portion of the stream including a pointer to data on the storage 314 to the storage controller 304. The storage controller 304 retrieves the requested data and returns the data to the accelerator logic 308 The accelerator logic 308 may retrieve the requested data after the accelerator logic 308 is reconfigured and as the accelerator logic 308 is accessing information about the computational task via the memory controller 306 such that the accelerator logic 308 executes the computational task as data is received.

After execution of the computational task by the accelerator logic 308 the accelerator logic 308 may, in some implementations, store a result on the shared file system by sending the result to the storage controller 304 The result of the computational task may be simultaneously returned to the host 106, either for display or for storage on the host 106. In other implementations, the result of the task may be returned directly to the host 106 without communicating the result to the storage controller 304. Alternatively, the result may be stored on the storage 314 by communication with the storage controller 304 without returning the result to the host 106. The result may also be stored on another storage component within or outside of the computational storage system 300 or returned to another host with access to the computational storage system 300.

Figure 4:
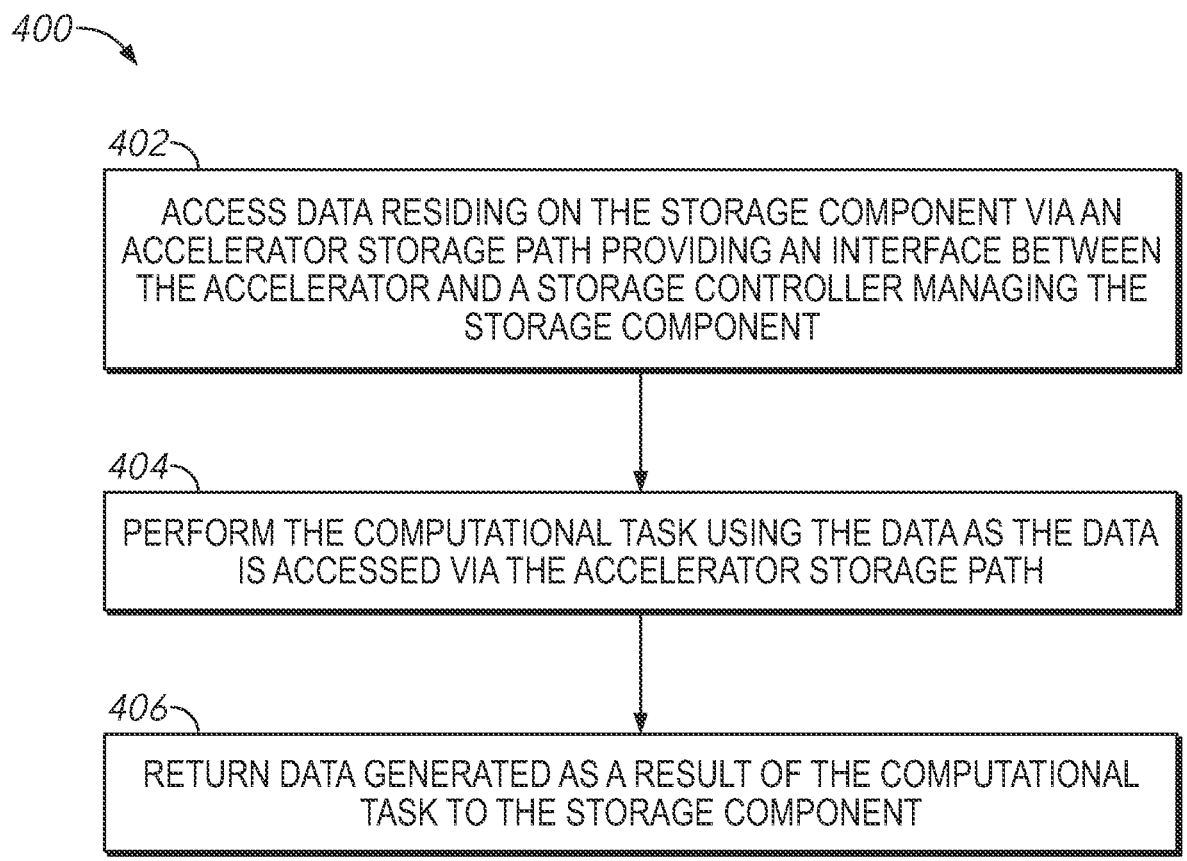
FIG. 4 illustrates a method 400 in accordance with examples described herein.

FIG. 4 illustrates a method in accordance with examples described herein. Routine 400 is generally executed by accelerator logic (e.g., accelerator logic 308) forming part of a computational storage system (e.g., computational storage system 300). In block 402, routine 400 accesses data residing on the storage via an accelerator storage path providing an interface between the accelerator and a storage controller managing the storage. In block 404, routine 400 performs the computational task using the data as the data is accessed via the accelerator storage path. Block 402 and block 504 may occur in parallel. In block 406, routine 400 returns data generated as a result of the computational task to the storage. In some implementations, additional blocks may be added to the routine 400.

In some implementations, the accelerator logic is reconfigurable such that the computational storage system may be used to perform several different computational tasks. Reconfigurable accelerator logic may be, for example, an FPGA. In these implementations, the host may send configuration data to the accelerator logic to customize the accelerator logic for a particular computational task.

Block 402 accesses data residing on a storage via an accelerator storage path providing an interface between the accelerator and a storage controller managing the storage. The storage forms a portion of a shared file system shared between the accelerator logic and a host (e.g., host 106) connected to the computational storage system. Accordingly, block 402 may be executed responsive to receipt, by the accelerator logic, of a command from the host to perform a computational task using data stored on the storage. The request from the host generally includes a pointer to the data's location within the shared file system. The accelerator logic directly accesses the data via the accelerator storage path by providing the pointer to the storage controller. Direct access of the data via the accelerator storage path generally means that the accelerator logic does not move the data to another memory location before beginning a computational task using the data as input. Instead, the accelerator logic can perform the computational task as the data is accessed via the accelerator storage path.

In some implementations, the computational storage system may be networked with other similar computational storage systems, also accessible by the host. For example, as shown in FIG. 2, multiple computational storage systems may be connected via a PCIe interface. As a result, the shared file system may be implemented using multiple storage components on multiple computational storage systems connected via an interface and the accelerator logic may additionally access data residing on storage components of other computational storage systems via the interface connecting the computational storage systems in addition to the operations of block 402. Further, in some implementations, the computational storage system including the accelerator logic performing the computational task may include several storage components and the accelerator logic may access data on additional storage components in parallel or sequentially with the operations of block 402.

Block 404 performs the computational task using the data as the data is accessed via the accelerator storage path. When performing the computational task using the data as the data is accessed via the accelerator storage path, the accelerator logic does not transfer the data to another storage location (e.g., storage DRAM storage) before performing the computational task using the data. Accordingly, the data moves between the accelerator logic and the storage (directed by a storage controller) and can bypass copying, downloading, or similar operations requiring movement of the data.

Block 406 returns data generated as a result of the computational task to the storage. In some implementations, a location on the storage (e.g., within the shared file system) is received by the accelerator logic with the initial computational task from the host. The accelerator logic may also return the generated data to the host for display, storage, or use in further computational tasks executed by the host CPU; to another computational storage system accessible by the host for storage or use in execution of further computational tasks; to another host with access to the shared file system of the computational storage system; or to other locations inside or outside of a network shared by the accelerator logic and the host. In some implementations, returns to alternative locations described above may occur in place of returning generated data to the storage.

Figure 5:
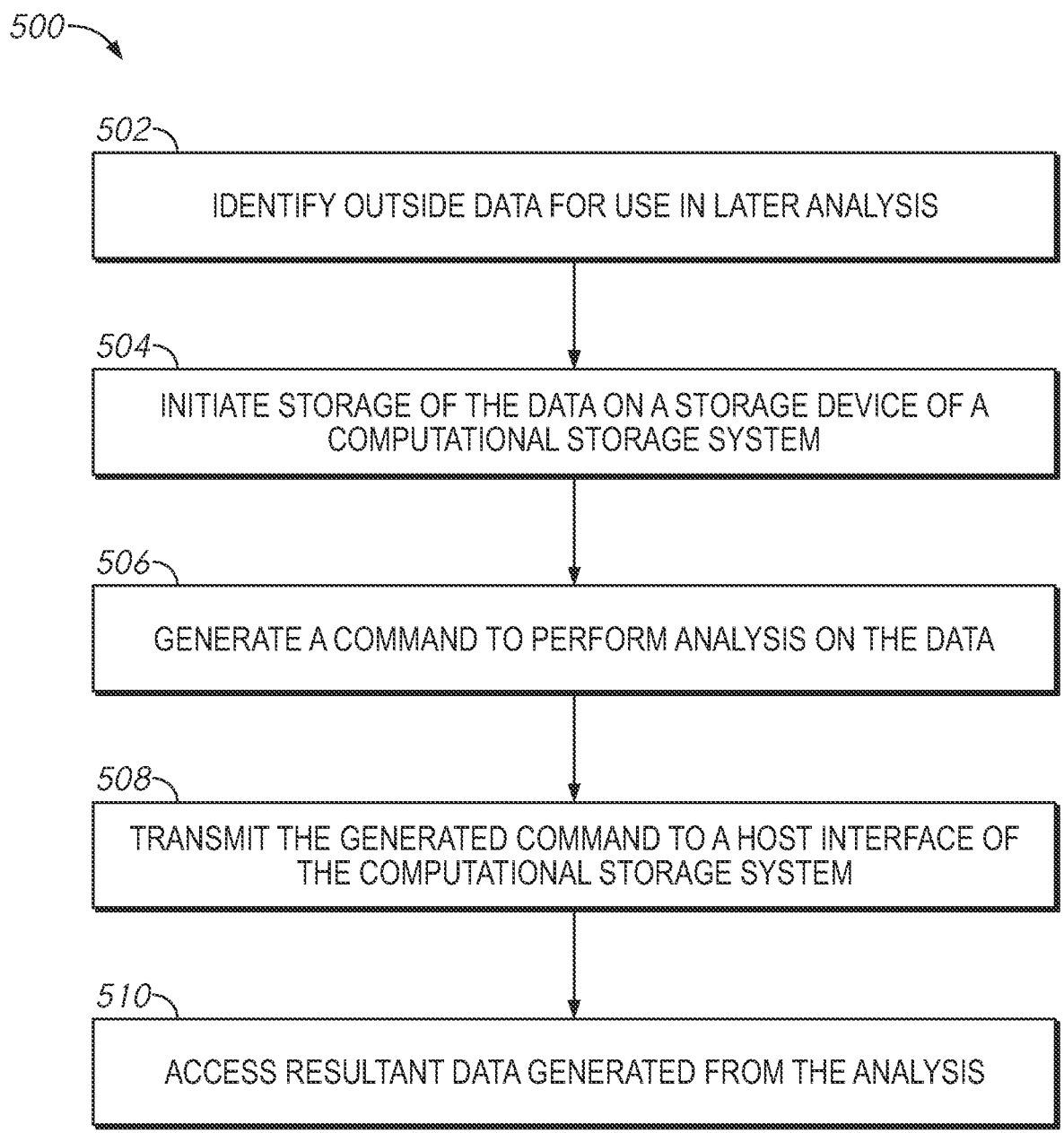
FIG. 5 illustrates a method 500 in accordance with examples described herein.

FIG. 5 illustrates a method in accordance with examples described herein. Routine 500 is generally executed by a host (e.g., host 106) using a computational storage system (e.g., computational storage system 300) for execution of computationally intensive tasks. In block 502, routine 500 identifies outside data for use in later analysis. In block 504, routine 500 initiates storage of the data on a storage device of a computational storage system. In block 506, routine 500 generates a command to perform analysis on the data. In block 508, routine 500 transmits the generated command to a host interface of the computational storage system. In block 510, routine 500 accesses resultant data generated from the analysis. In some implementations, additional blocks may be added to the routine 500.

Block 502 identifies outside data for use in later analysis. The outside data may be data collected at the direction of the host using a data collection device (e.g., data collection device 108). The outside data may additionally be data stored in third party storage (or other storage outside of an immediate network including the host) and accessible to the host via the Internet or other communications network. In some implementations, the identified data may include both data collected at the direction of the host by a data collection device and data stored in third party storage.

Block 504 initiates storage of the data on a storage device of a computational storage system. In some implementations, operations of block 502 and block 504 may occur in parallel. For example, when directing data collection by a data collection device, the host may include instructions to the data collection device to export or otherwise transfer collected data to the data storage device of the computational storage system. When the data is collected from another storage location, the host will direct download of the data to the storage device of the computational storage system. In some implementations, the host may request that data from more than one location be stored on the storage device. Further, the data may be stored on multiple storage devices, on the same or different computational storage systems, that form a portion of the shared file system. The host may access the shared file system and create an object, such as a folder or directory within the shared file system for storage of the data.

Block 506 generates a command to perform analysis on the data. The command may be generated as part of a larger program running on the host. Examples of analysis offloaded from the host to the accelerator logic of the computational storage system include, without limitation, maximum likelihood classifications, natural language processing, machine learning algorithms, and other processor intensive algorithms. The command may be generated as a series of API calls to the accelerator logic and may include configuration information for the accelerator logic, an identifier for the storage, a pointer to the location of data within the shared file system, instructions for how to store or export resultant data, and other information useful in execution of the computational task.

Block 508 transmits the generated command to a host interface of the computational storage system. The generated command may be transmitted as one or more streams from the host to the host interface of the computational storage system. The transmission may occur via a network (e.g., network 104) via a PCIe interface, LAN, WLAN, the Internet, or other network connecting the computational storage system and the host. Generally, the host interface parses the command to determine which component or components of the computational storage system the command is intended for. Once the command is transmitted to the accelerator logic, the accelerator logic may use routine 400 or a similar process to analyze data and return a result to the host or other storage.

Block 510 accesses resultant data generated from the analysis. In some implementations, the resultant data is returned to the host for further use in a program executed by the host or for storage on the host CPU. In other implementations, the host may access the resultant data from the storage or other location via the shared file system.

From the foregoing it will be appreciated that, although specific embodiments have been described herein for purposes of illustration, various modifications may be made while remaining with the scope of the claimed technology. Certain details are set forth herein to provide an understanding of described embodiments of technology. However, other examples may be practiced without various of these particular details. In some instances, well-known circuits, control signals, timing protocols, memory devices, and/or software operations have not been shown in detail in order to avoid unnecessarily obscuring the described embodiments. Other embodiments may be utilized, and other changes may be made, without departing from the spirit or scope of the subject matter presented here.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. A host comprising:
    a memory configured to store instructions; and
    a processor unit configured to execute the instructions to:
        initiate storage of outside data at memories across a plurality of computational storage systems forming a shared file system, wherein the plurality of computational storage systems are separate from the host;
        provide a command and a parameter to a computational storage system of the plurality of computational storage systems to cause the computational storage system to perform analysis on the outside data to provide resultant data, wherein the command is provided to the computational storage system via a host interface of the computational storage system, the host interface configured to parse the command, and wherein the parameter includes a pointer to the outside data; and
        retrieve the resultant data from the computational storage system.

2. The host of claim 1, wherein the processor unit is further configured to execute the instructions to identify the outside data for use in later analysis.

3. The host of claim 2, wherein the processor unit is further configured to execute the instructions to cause a data collection device to collect the outside data.

4. The host of claim 3, wherein the processor unit is further configured to execute the instructions to cause a data collection device to provide the collected outside data to the memory of the computational storage system.

5. The host of claim 2, wherein the processor unit is further configured to execute the instructions to identify the outside data at a third-party storage device via the Internet.

6. The host of claim 5, wherein the processor unit is further configured to execute the instructions to cause the third-party storage device to provide the outside data to the memory of the computational storage system.

7. The host of claim 1, wherein the processor unit is further configured to execute the instructions to generate the command to perform analysis on the outside data.

8. The host of claim 1, wherein the processor unit is further configured to execute the instructions to select a type of analysis to perform on the outside data from a maximum likelihood classification, natural language processing, or a machine learning algorithm.

9. The host of claim 1, wherein the parameter further includes a data size of the outside data.

10. A method comprising:
    initiating, by a host, storage of outside data at a memory of a computational storage system;
    causing storage of the outside data across a plurality of computational storage systems forming a shared file system, including the computational storage system, wherein the plurality of computational storage systems are separate from the host;
    providing a command and a parameter to the computational storage system to cause the computational storage system to perform analysis on the outside data to provide resultant data, wherein the command is provided to the computational storage system via a host interface of the computational storage system, the host interface configured to parse the command, and wherein the parameter includes a pointer to the outside data; and
    retrieving the resultant data from the computational storage system.

11. The host of claim 10, further comprising identifying the outside data for use in later analysis.

12. The method of claim 11, further comprising causing a data collection device to collect the outside data.

13. The method of claim 12, further comprising causing a data collection device to provide the collected outside data to the memory of the computational storage system.

14. The method of claim 11, further comprising identifying the outside data at a third-party storage device via the Internet.

15. The method of claim 14, further comprising causing the third-party storage device to provide the outside data to the memory of the computational storage system.

16. The method of claim 10, further comprising generating the command to perform analysis on the outside data.

17. The method of claim 10, further comprising selecting a type of analysis to perform on the outside data from a maximum likelihood classification, natural language processing, or a machine learning algorithm.

* * * * *